June 19, 1962 T. J. BENICHASA 3,039,179
APPARATUS FOR APPLYING PUSH BUTTONS TO
CANISTER VALVE STEMS Filed Feb. 15, 1960 5 Sheets-Sheet 3

INVENTOR.
THOMAS J. BENICHASA

BY Percy Freeman
ATTORNEY

June 19, 1962 T. J. BENICHASA 3,039,179
APPARATUS FOR APPLYING PUSH BUTTONS TO
CANISTER VALVE STEMS
Filed Feb. 15, 1960 5 Sheets-Sheet 5

INVENTOR.
THOMAS J. BENICHASA
BY Percy Freeman
ATTORNEY

United States Patent Office 3,039,179
Patented June 19, 1962

3,039,179
APPARATUS FOR APPLYING PUSH BUTTONS TO CANISTER VALVE STEMS
Thomas J. Benichasa, Brooklyn, N.Y., assignor to Kazmier Wysocki, Hackensack, N.J.
Filed Feb. 15, 1960, Ser. No. 8,687
5 Claims. (Cl. 29—208)

This invention relates to assembly apparatus and, more particularly, to apparatus for assembling dissimilar components to form a finished product.

It is an object of the present invention to provide apparatus for assembling dissimilar components into a finished product in a simple and efficient manner, with a high degree of accuracy and a minimum number of rejects.

Another object of the present invention is to provide a completely automatic assembly apparatus for applying push button nozzles to pressurized canisters, with a minimum loss of internal pressure, and without interfering with the remaining assembly process.

A more specific object of the present invention is to provide apparatus for orientating identical push button nozzle components from a quantity of random-arranged components within a hopper for delivery to a work station where such components are automatically applied to the valve stem of individual canisters positioned therewithin.

Still another specific object of the present invention is to provide a discriminating transport mechanism which will automatically arrange a plurality of identical assembly components for delivery to a work station for assembly with other components of a finished unit, such discriminating transport mechanisms automatically rejecting any articles that are not in proper initial position for movement to the feed line of the work station.

Still an additional object of the present invention is to provide a completely automatic article assembly unit which will sequentially apply a push button nozzle element to the valve stem of a pressurized canister, which unit is further provided with self-control devices for determining the sequence of operations upon each such article assembled.

Another more specific object of the present invention is to provide assembly apparatus for applying push button nozzle elements to the valve stems of pressurized canisters in an extremely rapid manner so as to prevent loss of any of the pressurized contents of the canister and entry thereof in the nozzle which would prevent clogging of the valve ducts and nozzle ports of the assembly.

All of the foregoing and still further objects and advantages of this invention will become apparent from a study of the following specification, taken in connection with the accompanying drawing, wherein.

Figure 1:
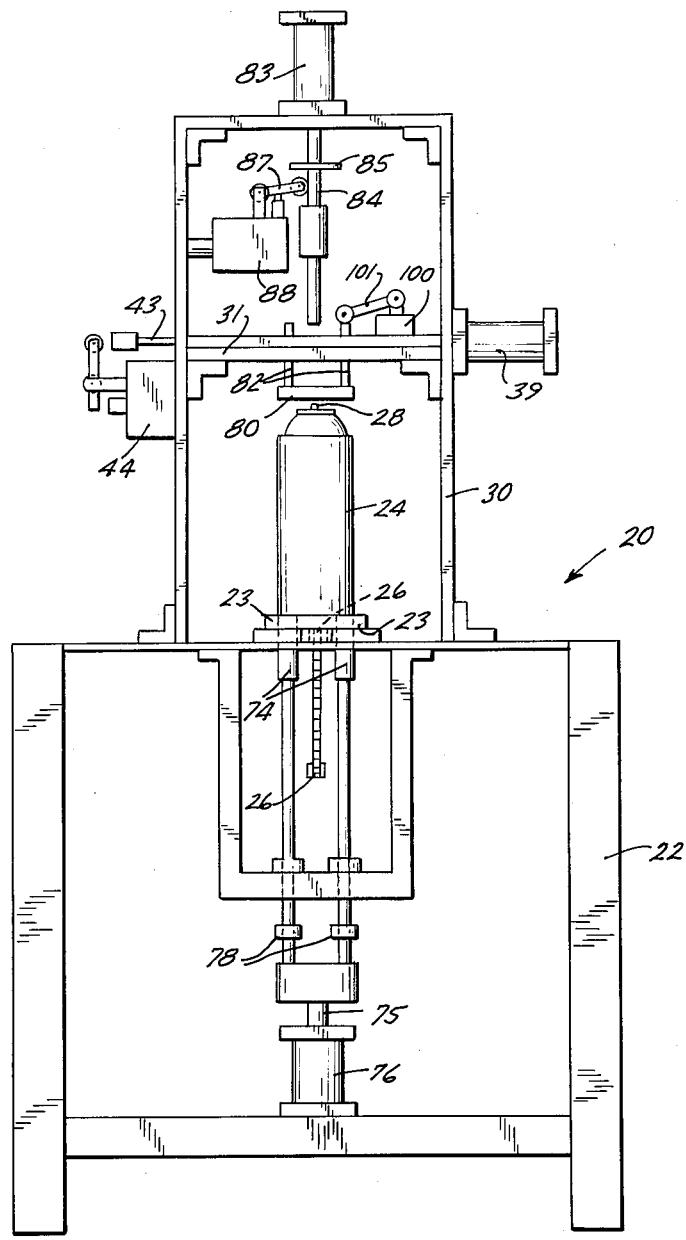
FIG. 1 is an end view of article assembly apparatus made in accordance with the present invention.
Figure 2:
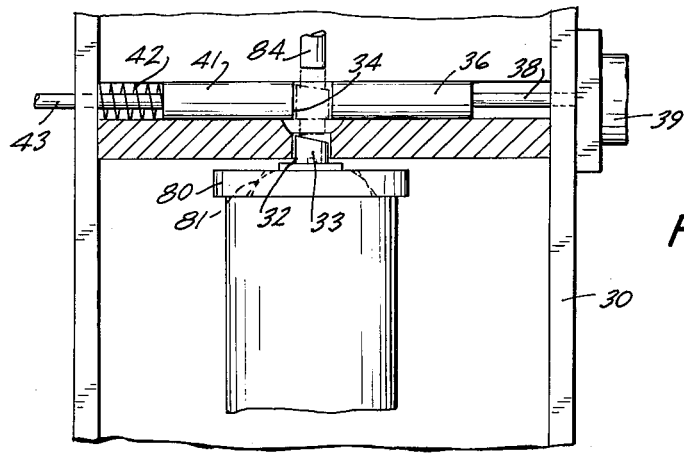
FIG. 2 is an enlarged fragmentary cross-sectional view of a work station forming a part of the present invention.

Referring now to the drawing, and more particularly to FIGS. 1 to 4 thereof, article assembly apparatus 20 made in accordance with the present invention is shown to include a conveyor frame 22 which forms a continuation of the other conveyor structure of the article fabricating machinery. This conveyor frame 22 also includes a pair of spaced apart parallel slides 23, upon which the individual, partly assembled, articles 24, such as pressurized and filled canisters, are slidably supported for movement along the assembly line. These containers 24 are moved individually along the slides 23 by longitudinally spaced apart lugs 25 of a continuous conveyor chain 26.

Each canister 24 is provided with a valve stem 28 to which a push button nozzle element is to be attached, each such push button nozzle providing means for opening the valve structure and directing the pressurized spray from the canister. In order to apply such push button nozzle elements to the valve stems 28, they must be driven at a relatively high rate of speed and with considerable force on to the valve stem 28, in order to effect the assembly thereof without loss of pressure or contents from the interior of the canister.

The individual push button nozzle members 33 are applied to the canister valve stems 28 at the work station of the assembly 20, in the vicinity of a cross piece 31 of a super-structure 30. As is clearly shown in FIG. 2 of the drawing, such cross piece 31 is provided with a downwardly beveled opening 32 through which individual push buttons 33 are guided toward the valve stem 28 of a single canister supported in proper position in a manner hereinafter more fully described.

Figure 3:
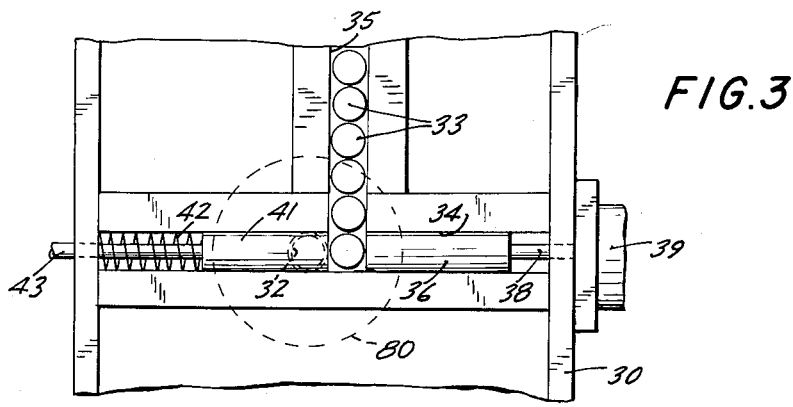
FIG. 3 is a fragmentary plan view of certain parts of the work station shown in FIG. 2.
Figure 4:
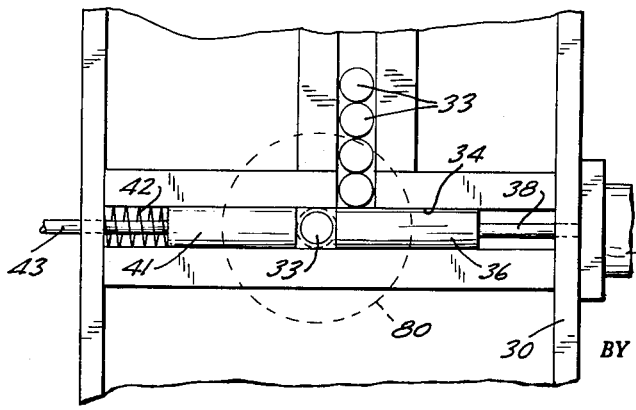
FIG. 4 is a view similar to FIG. 3, of the parts in an adjusted position.

FIGURES 3 and 4 of the drawing illustrate the manner in which single push button nozzles 33 are directed to the bevel opening 32 through the cross piece 31. A cross guide channel 34 extends transversely of a longitudinal feed guide 35, such feed guide 35 slidably receiving a continuous series or row of such articles 33 supplied thereto from a remote location. A push bar 36 slidably received within the cross guide 34, in a normally retracted position, as shown in FIG. 3, allows for the entry of a single button 33 from the feed guide 35. Upon actuation of the push bar 36 by the plunger 38 of an air piston 39, the push bar 36 shifts laterally a predetermined distance, as shown in FIG. 4, to move such single push button 33 into alignment with the beveled opening 32 of the cross piece 31, and into which opening or aperture 32 such single button drops. Such movement of the push bar 36 also blocks continued movement of the series of buttons 33 in the longitudinal feed guide 35 into the cross guide 34 until such push bar is retracted, whereupon the next such push button is allowed to proceed into the cross guide 34 in the manner hereinbefore described. A sensing bar 41 also slidably received within the cross guide 34, on the opposite side of the push button from the push bar 36, is movable laterally against the action of a compression spring 42 to shift a plunger 43 of a limit switch 44 whose function will be hereinafter more fully discussed.

Figure 5:
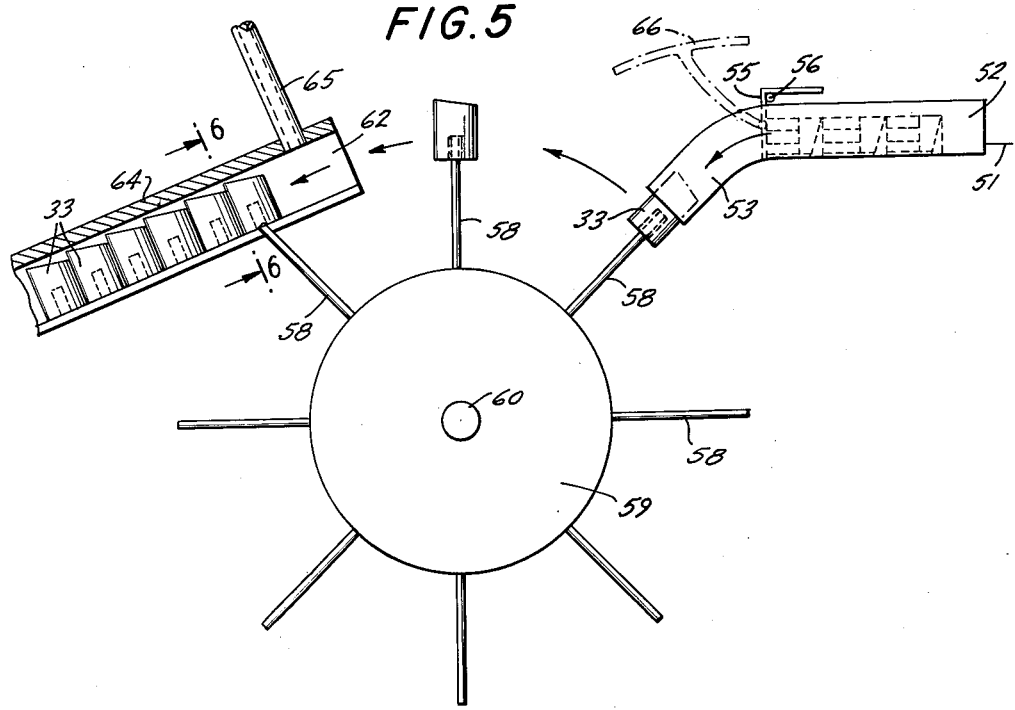
FIG. 5 is an enlarged fragmentary side elevational view of a discriminating transport mechanism forming a part of the present invention.
Figure 6:
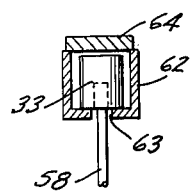
FIG. 6 is a fragmentary cross-sectional view taken along line 6—6 of FIG. 5.
Figure 7:
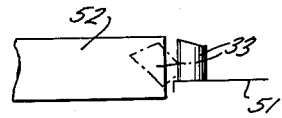
FIG. 7 is a fragmentary side elevational view of certain orientating parts of the present invention.
Figure 8:
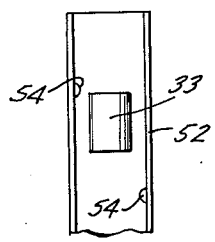
FIG. 8 is a fragmentary plan view of still other orientating parts of the present invention.
Figure 9:
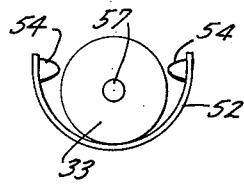
FIG. 9 is a front plan view of the parts shown in FIG. 8.
Figure 10:
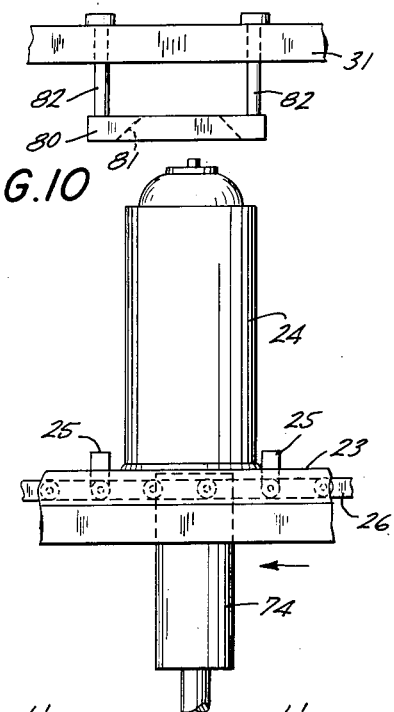
FIG. 10 is a fragmentary side elevational view of the canister transport mechanism forming another part of the present invention, and the canister positioning means thereof.
Figure 11:
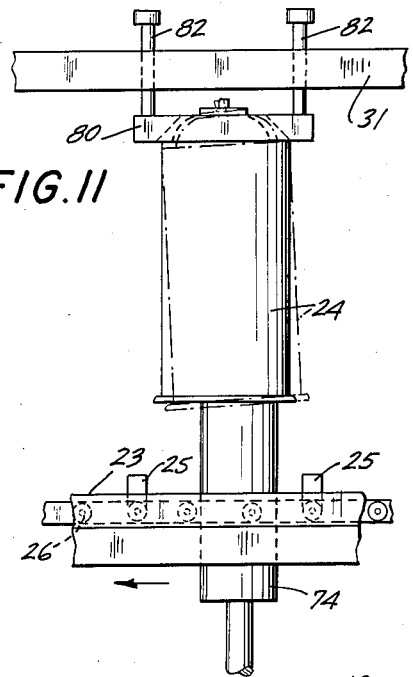
FIG. 11 is a view similar to FIG. 10, with the parts in an adjusted position.
Figure 12:
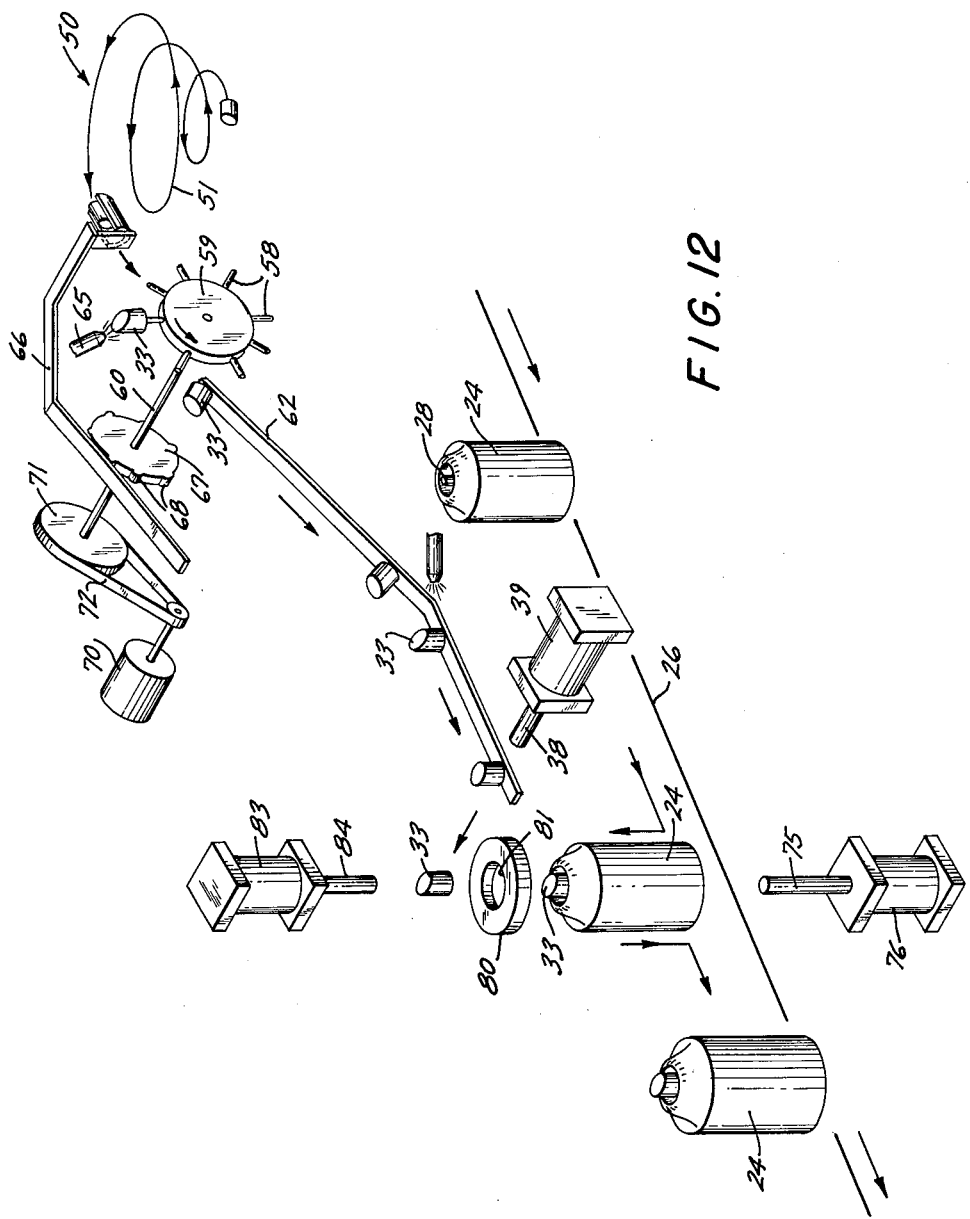
FIG. 12 is a perspective diagrammatic view of the main operating parts of the present invention, illustrating the sequence and manner of operation of the assembly.

With further references now to FIGS. 5 and 12 of the drawing, apparatus is shown for orientating and feeding pre-arranged and prepositioned pressure button nozzles to the work station. Such buttons 33 are placed within a nozzle in a mass, all in different positions. Such hopper is equipped with a vibratory hopper of the type disclosed in Patent No. 2,872,019, granted February 3, 1959. This hopper 50 includes a track or guide 51 along which a continuous row of buttons 33 are moved upwardly and into a positioning chute 52, of trough-like construction, having a plurality of detents 54 for aligning such buttons 33 in a longitudinal direction. The outlet end of the guide 51 empties into and above the positioning chute 52, as shown in FIG. 7, to assure the longitudinal orientation of the buttons (to prevent upright movement of such buttons along the positioning chute 52 with the longitudinal axis of the buttons extending normal to the longitudinal axis of the chute). With the buttons thus lying down, the detents 54 then assure that the movement of the buttons 33 is in a direction parallel to the longitudinal axes thereof, as is specifically shown in FIGURES 8 and 9.

A stop plate 55 pivotally mounted upon a shaft 56 adjacent to the terminal end of the positioning chute 52, serves as a metering device to allow movement of only one such button 33 at a time outwardly and downwardly through the outlet portion 53 of the chute. This stop plate 55 is controlled by a leaf spring 66 which is lifted at predetermined intervals by detents 68 on a cam wheel 67 that is secured to a shaft 60 common to a pickup wheel or disc 59. This pickup wheel 59 is provided with a plurality of circumferentially spaced apart and radially outwardly extending pins 58 which are rotated into axial alignment with the push buttons 33 discharged from the outlet 53 of the positioning chute 52. Each such push button 33 is provided with a single aperture 57 that opens outwardly from one longitudinal extremity of the button. Thus, those buttons passing downwardly through the outlet 53 of the chute 52, having their openings 57 facing toward the pickup pins 58 of the wheel 59, will be carried upon the respective pin 58 through an arc of rotation of the wheel 59 to a feeder chute 62 forming a part of the feed guide 35 adjacent to the work station. By controlling the timing of the cam 67 and the pickup wheel 59, in any suitable manner, the control spring 66 of the stop plate 55 can be made to release a single button 33 each time a pickup pin 58 is in axial alignment with the outlet 53 of the positioning chute 52. Thus, while all such buttons 33 having their openings 57 facing the pickup pins 58 will be carried to the feeder chute 62, all buttons orientated in the opposite direction will be discriminated against and returned to the bottom of the hopper 50 by gravity, as the pickup pins 58 will fail to engage such improperly orientated buttons. As a result, all such buttons 33 deposited upon the feeder chute 62 will be properly aligned and orientated for direct delivery to the work station.

The feeder chute 62 is of generally channel-shaped cross-sectional configuration having a transparent cover plate 64 through which the deposited buttons are visible, and which cover plate prevents tumbling of the buttons during downward movement from an elevated position toward the work station of the assembly. The base wall of the feeder chute 62 is provided with a longitudinal slot 63 into which the pickup pins 58 of the discriminating pickup wheel are received. As a result, the base wall of the feeder chute 62 will lift the buttons 33 carried by the pins 58, as the wheel 59 is rotated. An air jet 65 adjacent to the inlet end of the feeder chute 62 further aids to position each button as it is released by its respective pickup pin 58.

In the event that the pickup chute 62 is filled with buttons, the deposit of additional buttons will be physically blocked, thus preventing continued rotation of the cam shaft 60 and continued release of the wall plate 55 by the control spring 66. Such blocking of continued rotation of the shaft 60 may be accommodated, such as by slippage of the drive belt 72, or any other suitable clutch mechanism. The rate of feed is thus automatically controlled by the working parts of the assembly so as to assure an adequate supply of buttons 33 into the feeder chute 62 at all times. Since the cam shaft 60 is driven by the motor 70, independently of the conveyor belt drive motor, the speed at which the push buttons 33 are deposited upon the feeder chute 62 may be independently controlled.

Directly beneath the work station, a pair of lift bars 74 are movable vertically through the canister slides 23 by the plunger 75 of a fluid pressure piston 76. Stop elements 78 carried by the lift bars 74 limit the upward and downward movement of such lift bars 74. In response to actuation of the air piston 76, the canister 24 overlying the lift bars 74, is lifted vertically into engagement with a positioning ring 80 slidably suspended from the cross piece 31 on a pair of depending arms 82. This positioning ring 80 has a downwardly opening beveled recess 81 within which the upper valve mechanism of the canister 24 is received, and which recess 81 upon upward movement of the positioning ring upon the cross piece 31, is in axial alignment with the aperture 32 into which each push button 33 is deposited.

Another air piston 83 carried upon the top of the superstructure 30, is provided with a driving plunger 84 which is movable downwardly through the work station aperture 32 in the cross piece 31, thus serving as actuating means to drive the push button 33 received therewithin downwardly into assembly with the upwardly projecting stem 28 of the canister valve. Such downward movement of the plunger 84 is swift and hard so as to effect such connection between the push button and valve stem instantaneously and without loss of pressure or contents of the canister 24. Stated otherwise, at the same instant plunger 84 is actuated to move downwardly, plunger 75 is simultaneously actuated to move bars 74 downwardly. The downward action of bars 74 is sufficiently fast that at the instant plunger 84 strikes the button 33, the canister 24 is momentarily suspended in space and then driven downwardly by the force of plunger 84. It is by this method of high speed operation that the button is applied without the release of the product from within the pressurized canister.

Figure 13:
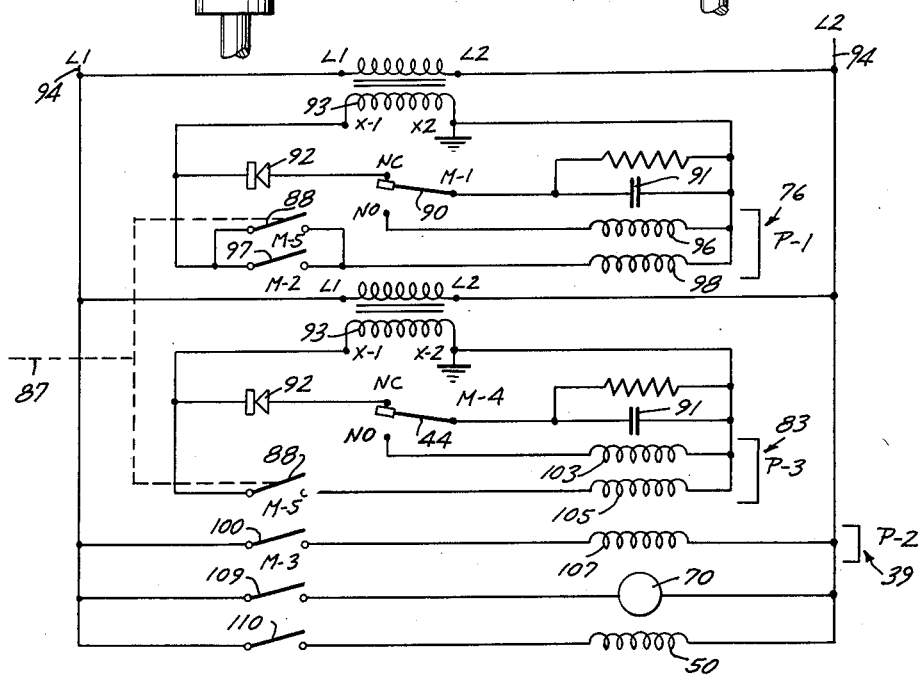
FIG. 13 is a schematic wiring diagram of the assembly shown in FIG. 12.

Reference is now made to FIGURE 13 of the drawing which illustrates the control circuit which determines the sequence of operation of the various parts of the present invention. The indexing time for the entire assembly line is controlled by the driving motor of the conveyor. Connected to the driving motor is a continuous rotating cam timer having two cams, each of which operates one of two separate switches 90, 97. In the present illustration, the cams are timed to make one revolution each second and are so arranged that they provide a single momentary closing of their respective switches once during each revolution. Line voltage across the inward terminals 94 is reduced by means of individual transformers 93 for each of the lower and upper piston units 76, 83. This reduced voltage is rectified by a selenium rectifier 92, in each instance, which current is used to charge a capacitor 91. Each capacitor stores a charge large enough to energize the extension coil 96, 103 of the solenoids controlling the extension valves of the lower and upper air cylinder plungers 75, 84, respectively. Thus, when a container is in proper position beneath the work station, and the initiating switch 90 is closed by the timing cam of the conveyor chain, the extension coil 96 of an operating solenoid of the lower piston 76 is energized which causes the lift bars 74 to raise the canister into the downwardly opening recess 81 of the positioning ring 80. This causes the positioning ring 80 to be elevated, so that one of the arms 82 thereof actuates a link 101 to close another switch 100 that energizes the control solenoid of the push bar air piston 39 that controls movement of the push bar 36 and movement of a single push button into the aperture 32 of the cross piece 31.

Before proceeding further with the description of the operation of the present invention, it is to be noted that in the event a container is not in proper position above the lift bars 74 at the time that the timing cam closes the initiating switch 90, the positioning ring 80 will not be elevated, thus negating the closing of the push bar solenoid switch 100. As a result, the second cam driven by the conveyor chain motor is operative to close the other cam operated switch 97, at a predetermined time lag following the initial closing of the initiating switch 90, which switch 97 effects energization of the retracting coil 98 of the lower pair piston 76, thus returning the lift bars 74 to their initial position ready to receive the next canister of the assembly line. This arrangement prevents actuation of the push bar 36 unless a canister is in place and ready to receive the push button 33 fed thereby.

When a canister is in proper position to receive a push button, such push button having been moved into alignment with the aperture 32 in the cross piece 31, the sensing bar 41 acting against the spring 42 actuates the plunger 43 of the switch 44 which controls energization of the extension coil 103 of the upper fluid pressure piston 83 to drive the plunger 84 thereof downwardly into engagement with the positioned push button 33 and into assembly with the valve stem 28 of the properly positioned canister at an extremely fast rate. If, however, a button has not been previously fed into the cross guide 34 of the work station, the sensing bar 41 will remain in its initial position so as to prevent the closing of the sensing switch 44, following which the delayed closing of the reset switch 97 will return the lift bars 74 to their lowered position, thus allowing the canister to move onto the next assembly station without having the driving plunger 84 of the upper piston 83 actuated.

With reference to FIGURE 1 of the drawing, it will be noted that the driving plunger 84 is provided with a plate 85 which actuates an arm 87 of a reset switch 88 that closes the electrical circuit through the retraction coil 105 of the valve control solenoid of the upper air cylinder piston 83. This automatically retracts the driving plunger 84 following its downward driving movement, so as to ready it for the next sequence of operation.

In each of the lower and upper fluid pressure responsive piston units 76, 83, the extension coils 96, 103 and retraction coils 98, 105, respectively, control the extension and retraction of the associated plungers 75, 84, respectively, thus providing a positive control of each movement of such plungers. The sensing switch 100, however, controls the energization and deenergization of the single coil 107 of the solenoid of the push bar piston 39 which is spring biased toward a retracted position by the compression spring 42. Each of the wheel motor 70 and vibrator 50 may be individually controlled by manually operated switches 109, 110, respectively.

It will now be recognized that a completely automatic assembly device has been provided which will properly orientate randomly disposed components for assembly with another subassembly moved along the conveyor line, and especially for the rapid assembly thereof to prevent loss of pressure from internally pressurized valve operated canisters.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Apparatus for applying push buttons to canister valve stems comprising, in combination, a button positioning device, button feed means supplying individual buttons to said positioning device, canister positioning means aligning individual canisters with said positioning device, and actuating means for driving each button from said button positioning device onto the valve stem of the canister aligned therewith by said canister positioning means, said button positioning device comprising a first plate having a central aperture, said feed means supplying individual buttons to said central aperture in coaxial alignment therewith, said canister positioning means comprising a positioning ring having a central opening on one side coaxially aligned with said aperture, and said actuating means comprising a plunger movable coaxially of said aperture from one side of said first plate toward one side of said ring, said canister positioning ring further comprising means for moving said canister into said opening to align the stem of the canister with a button carried within said aperture of said plate preliminary to initiation of said actuating means.

2. Apparatus for assembling a first member with a second member, a positioning device at least momentarily aligning a single first member with a single second member, driving means for connecting said first and second members in said aligned position defined by said positioning device, and feed means sequentially delivering individual ones of a continuous series of said first members into said positioning device in response to the presence of each subsequent one of said second members in said positioning device, said feed means comprising a longitudinal feed guide receiving said series of said first members in a single row, and a transversely extending cross guide intersecting with said feed guide receiving a single one of said row of said first members from said feed guide for delivery to said positioning device.

3. Apparatus for assembling a first member with a second member as set forth in claim 2, comprising a push bar slidably supported within said cross guide displacing each single one of said row of said first members received within said cross guide from said feed guide, said positioning device comprising a plate having a central aperture extending therethrough, said aperture being of slightly larger size than said first member, and communicating with said cross guide laterally spaced from said feed guide and slidably receiving each said single first member therethrough in response to said displacement of push bar, said positioning device further comprising a recess coaxial with said aperture receiving each second member therewithin, whereby said first member in response to movement along said cross guide by said push bar passes through said aperture and into engagement with said second member.

4. Apparatus for assembling a first member with a second member as set forth in claim 3, wherein said driving means comprises a plunger movable coaxially through said aperture for driving said first member aligned therewithin toward a second member aligned therewith by said positioning device.

5. Article orientating means comprising a vibrator having a positioning chute for aligning and advancing a mass of identical articles each being symmetrical about a longitudinal axis and having a coaxial bore extending inwardly from one longitudinal extremity, a feeder chute in spaced apart relationship with said positioning chute, and a discriminating transport mechanism transferring from said positioning chute the articles receivable upon said feeding chute with said one longitudinal extremity facing in a common direction, said discriminating transport mechanism comprising a wheel supported for rotation in a vertical plane intermediate and at a lower level than said positioning chute and said feeder chute, said wheel having a plurality of circumferentially spaced apart and radially outwardly extending pins of smaller diameter than the diameter of said longitudinal bore of each article, said positioning chute discharging said articles longitudinally in a direction radially toward said wheel, whereby each article having said one longitudinal end facing said wheel receives one of said pins within said longitudinal bore thereof upon movement in said radial direction toward said one pin at least momentarily aligned therewith, and said feeder chute having means for removing each article carried by said pins of said wheel from said positioning chute, said feeder chute being of generally channel-shaped configuration, and said removing means comprising a longitudinal slot in the base wall of said channel-shaped chute accommodating rotation of said wheel pins therethrough, said base wall of said feeder chute lifting each said article from said pins of said wheel.

References Cited in the file of this patent

UNITED STATES PATENTS

| | | |
|---|---|---|
| 2,155,958 | Schmidt | Apr. 25, 1939 |
| 2,310,638 | Hubbard | Feb. 9, 1943 |
| 2,324,925 | Hallowell | July 20, 1943 |
| 2,431,279 | Remington | Nov. 18, 1947 |
| 2,655,718 | Haegele | Oct. 20, 1953 |
| 2,662,626 | Graham | Dec. 15, 1953 |
| 2,672,837 | Maher | Mar. 23, 1954 |
| 2,810,249 | Wysocki | Oct. 22, 1957 |
| 2,875,512 | Rau | Mar. 3, 1959 |